(12) United States Patent
Kozu et al.

(10) Patent No.: US 8,974,058 B2
(45) Date of Patent: Mar. 10, 2015

(54) EYEGLASS LENS AND DESIGN METHOD, MANUFACTURING METHOD AND DESIGN SYSTEM FOR EYEGLASS LENS

(71) Applicant: Hoya Corporation, Shinjuku-ku, Tokyo (JP)

(72) Inventors: Kazuma Kozu, Tokyo (JP); Tomohiro Odaira, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/793,182

(22) Filed: Mar. 11, 2013

(65) Prior Publication Data
US 2013/0235336 A1    Sep. 12, 2013

(30) Foreign Application Priority Data
Mar. 12, 2012    (JP) ................. 2012-054383

(51) Int. Cl.
*G02C 7/06*    (2006.01)
*G02C 7/02*    (2006.01)

(52) U.S. Cl.
CPC ........... *G02C 7/061* (2013.01); *G02C 7/024* (2013.01); *G02C 7/065* (2013.01); *G02C 7/066* (2013.01)
USPC .................. 351/159.42; 351/159.75

(58) Field of Classification Search
CPC ........ G02C 7/021; G02C 7/024; G02C 7/028; G02C 7/06; G02C 7/065; G02C 7/066
USPC .............. 351/159.41–159.43, 159.74, 159.75
See application file for complete search history.

(56) References Cited

U.S. PATENT DOCUMENTS

| | | | |
|---|---|---|---|
| 3,711,191 A | 1/1973 | Tagnon | |
| 4,606,622 A | 8/1986 | FueGerhard et al. | |
| 5,864,380 A | 1/1999 | Umeda | |
| 5,892,565 A | 4/1999 | Ueno et al. | |

(Continued)

FOREIGN PATENT DOCUMENTS

| | | |
|---|---|---|
| JP | 9-251143 A | 9/1997 |
| JP | 10-123467 A | 5/1998 |

(Continued)

OTHER PUBLICATIONS

Extended European Search Report issued in the EP counterpart Application No. 13158309.8 dated Mar. 14, 2014.

*Primary Examiner* — Darryl J Collins
(74) *Attorney, Agent, or Firm* — Sughrue Mion, PLLC (57) ABSTRACT

An eyeglass lens, comprising: a hidden mark defining a predetermined reference point; and refractive portions arranged along a meridian extending substantially in a vertical direction via the predetermined reference point, and wherein the refractive portions comprises: a first refractive portion located on a lower side of the predetermined reference point and having a first refractive power; a second refractive portion located on an upper side of the predetermined reference point and having a second refractive power smaller than the first refractive power; and an intermediate refractive portion in which refractive power continuously decreases, and an aberration distribution in the first refractive portion is substantially symmetrical in a left and right direction with respect to the meridian extending in the vertical direction, and an aberration distribution in the second refractive portion is asymmetrical in the left and right direction with respect to the meridian shifted to an ear side.

10 Claims, 5 Drawing Sheets

(56) References Cited

U.S. PATENT DOCUMENTS

2004/0189932 A1  9/2004  Shinohara et al.
2011/0211159 A1* 9/2011  Suzuki .......................... 351/169

FOREIGN PATENT DOCUMENTS

| | | |
|---|---|---|
| JP | 2002-122825 A | 4/2002 |
| JP | 2004-191757 A | 7/2004 |

* cited by examiner

EYEGLASS LENS AND DESIGN METHOD, MANUFACTURING METHOD AND DESIGN SYSTEM FOR EYEGLASS LENS

CROSS-REFERENCE TO RELATED APPLICATION

This application claims priority under 35 U.S.C. §119 from Japanese Patent Application No. 2012-054383, filed on Mar. 12, 2012. The entire subject matter of the application is incorporated herein by reference.

BACKGROUND

1. Technical Field

The present invention relates to an eyeglass lens including a plurality of areas having different powers, and to a design method, a manufacturing method and a design system for such an eyeglass lens.

2. Related Art

In design of eyeglass lens having a progressive power zone, a meridian is defined by considering movement of a visual line of a wearer from distance vision to near vision, and a clear vision area having a small level of distortion and shaking of an image is set with respect to the defined meridian. Concrete examples of eyeglass lenses designed as described above are disclosed, for example, in Japanese Patent Provisional Publication Nos. 2004-191757A (hereafter, referred to as "patent document 1"), HEI 10-123467A (hereafter, referred to as "patent document 2") and HEI 9-251143A (hereafter, referred to as "patent document 3").

SUMMARY OF THE INVENTION

In the eyeglass lens described in each of patent documents 1 and 2, the meridian is defined as a straight line extending in the vertical direction on the lens, and the clear vision area is distributed along meridian in the vertical direction. Therefore, as the degree of convergence of eyes of a wearer increases according to near vision of the wearer, the visual line becomes farther from the meridian (becomes closer to the nose side). In this case, a problem may arise that the visual line departs from the clear vision area and the wearer perceives distortion or shaking of an image.

On the other hand, in the eyeglass lens described in patent document 3, the meridian is defined considering the convergence of eyes. Specifically, the meridian is inclined with respect to the vertical direction considering the convergence of eyes for near vision. However, aberration in a lateral area on the ear side in a near portion is shifted to the nose side due to inclination of the meridian, the near visual field on the ear side is narrowed. In patent document 3 an example where the meridian is moved to the nose side only in the near portion is described; however, in this case the aberration concentrates on the lateral area on the nose side due to inward shifting of the meridian. Therefore, when the wearer moves his/her visual line to the noise side for near vision, the wearer may perceive a large level of distortion or shaking of an image.

The present invention is advantageous in that it provides an eyeglass lens suitable for avoiding concentration of aberrations on a nose side and securing a near visual field while considering convergence of eyes of a wearer, and a design method, a manufacturing method and a design system for such an eyeglass lens.

According to an aspect of the invention, there is provided an eyeglass lens, comprising: a hidden mark defining a predetermined reference point on the eyeglass lens; and a plurality of refractive portions arranged along a meridian extending substantially in a vertical direction on the eyeglass lens via the predetermined reference point defined by the hidden mark. The plurality of refractive portions comprises: a first refractive portion which is located on a lower side of the predetermined reference point and has a first refractive power; a second refractive portion which is located on an upper side of the predetermined reference point and has a second refractive power smaller than the first refractive power; and an intermediate refractive portion in which refractive power continuously decreases from the first refractive portion to the second refractive portion. In this configuration, an aberration distribution in the first refractive portion is substantially symmetrical in a left and right direction with respect to the meridian extending in the vertical direction in the first refractive portion, and an aberration distribution in the second refractive portion is asymmetrical in the left and right direction with respect to the meridian shifted to an ear side in the second refractive portion in a wearing state. In this case, the lower side and the upper side of the reference point means the lower side and the upper side of the reference point in a state where a wearer wears eyeglass lenses.

With this configuration, the aberration occurs substantially symmetrical in the left and right direction with respect to the meridian without intensively occurring on the nose side or the ear side in the first refractive portion, and further the visual field can be secured on both of the nose side and the ear side. Therefore, the wearer is hard to perceive a large level of distortion or shaking of an image not also in the case where the wearer moves the visual line to the nose side for near vision, but also in the case where the wearer moves the visual line to the ear side. Furthermore, when the wearer moves the visual line to the second refractive portion, eyes diverge and the visual line is easy to be included in the clear vision area of the second refractive portion shifted outward to the ear side. Therefore, the wearer is hard to perceive a large level of distortion or shaking of an image. In general, the term "clear vision area" means an area where the amount of astigmatism is smaller than or equal to 0.5-1.00 D. That is, it is possible to provide an eyeglass lens suitable for avoiding concentration of aberrations on a nose side and securing a near visual field while considering divergence of eyes (in other words, convergence of eyes) of a wearer.

The meridian may extend in the vertical direction from a lower edge of the eyeglass lens to the predetermined reference point, and may be shifted outward to the ear side in accordance with divergence of eyes from the predetermined reference point to an upper edge of the eyeglass lens.

The meridian may extend in the vertical direction at least in the first refractive portion, and then extend to be inclined to the ear side along divergence of eyes in the intermediate refractive portion and the second refractive portion. In this case, an aberration distribution in the intermediate refractive portion and the second refractive portion is asymmetrical in the left and right direction with respect to the meridian inclined to the ear side in the intermediate refractive portion and the second refractive portion.

When a focal length corresponding to the first refractive power is defined as a first focal length and a focal length corresponding to the second refractive power is defined as a second focal length, the first focal length may be longer than or equal to 0.4 m and may be shorter than the second focal length, and the second focal length may be longer than the first focal length and may be shorter than or equal to 1.5 m.

According to another aspect of the invention, there is provided a design method for an eyeglass lens including a plurality of refractive portions arranged along a meridian extending substantially in a vertical direction on the eyeglass lens, the plurality of refractive portions including a first refractive portion having a first refractive power, a second refractive portion having a second refractive power smaller than the first refractive power and an intermediate refractive portion in which refractive power continuously decreases from the first refractive portion to the second refractive portion. The method comprises: an outward shift amount calculation step of calculating an outward shift amount of the second refractive portion toward an ear side with respect to the first refractive portion in a wearing state, based on prescription information; an meridian setting step of letting the meridian extend in a vertical direction at least in the first refractive portion and shifting outward the meridian extended in the vertical direction to the ear side at least in the second refractive portion in accordance with the outward shift amount; a first aberration setting step of setting an aberration distribution in the first refractive portion to be substantially symmetrical in a left and right direction with respect to the meridian extending in the vertical direction; and a second aberration setting step of setting an aberration distribution in the second refractive portion to be asymmetrical in the left and right direction with respect to the meridian shifted outward to the ear side.

With this configuration, it becomes possible to provide a design method for an eyeglass lens suitable for avoiding concentration of aberrations on a nose side and securing a near visual field while considering divergence of eyes (in other words, convergence of eyes) of a wearer.

The design method may further comprise a mark setting step of setting a hidden mark for defining a predetermined reference point on the eyeglass lens. In this case, the first refractive portion is located on a lower side of the predetermined reference point defined by the hidden mark. The second refractive portion is located on an upper side of the predetermined reference point. In the meridian setting step, the meridian extends in the vertical direction from a lower edge of the eyeglass lens to the predetermined reference point, and is shifted outward to the ear side in accordance with the outward shift amount from the predetermined reference point to an upper edge of the eyeglass lens.

According to another aspect of the invention, there is provided a manufacturing method for an eyeglass lens, comprising: an eyeglass lens manufacturing step of manufacturing an eyeglass lens designed using the above described design method for an eyeglass lens.

With this configuration, it becomes possible to provide a manufacturing method for an eyeglass lens suitable for avoiding concentration of aberrations on a nose side and securing a near visual field while considering divergence of eyes (in other words, convergence of eyes) of a wearer.

According to another aspect of the invention, there is provided a design system for an eyeglass lens including a plurality of refractive portions arranged along a meridian extending substantially in a vertical direction, the plurality of refractive portions including a first refractive portion having a first refractive power, a second refractive portion having a second refractive power smaller than the first refractive power and an intermediate refractive portion in which refractive power continuously decreases from the first refractive portion to the second refractive portion. The design system comprises: an ordering side terminal device that transmits prescription information as ordering data; and a design side terminal device that receives the ordering data and designs the eyeglass lens adapted to the prescription information. The design side terminal device comprises: an outward shift amount calculation unit that calculates an outward shift amount of the second refractive portion toward an ear side with respect to the first refractive portion in a wearing state, based on the prescription information; an meridian setting unit that lets the meridian extend in a vertical direction at least in the first refractive portion and shift outward the meridian extended in the vertical direction to the ear side at least in the second refractive portion based on the outward shift amount; a first aberration setting unit that sets an aberration distribution in the first refractive portion to be substantially symmetrical in a left and right direction with respect to the meridian extending in the vertical direction; and a second aberration setting unit that sets an aberration distribution in the second refractive portion to be asymmetrical in the left and right direction with respect to the meridian shifted outward to the ear side.

With this configuration, it becomes possible to provide a design system for an eyeglass lens suitable for avoiding concentration of aberrations on a nose side and securing a near visual field while considering divergence of eyes (in other words, convergence of eyes) of a wearer.

DETAILED DESCRIPTION OF THE EMBODIMENTS

Hereinafter, embodiments according to the invention are described with reference to the accompanying drawings.

Figure 1:
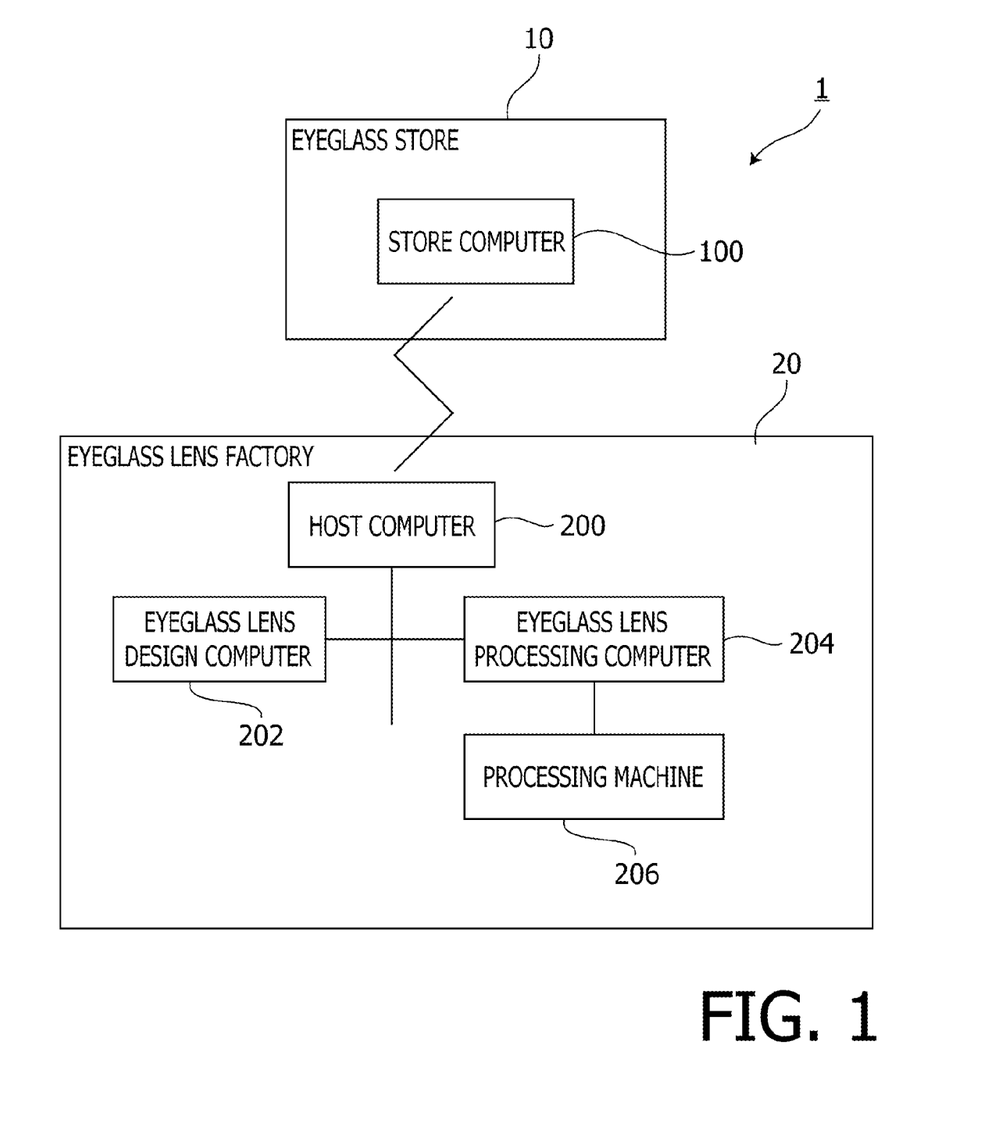
FIG. 1 is a block diagram illustrating a configuration of an eyeglass lens manufacturing system for realizing a manufacturing method for an eyeglass lens according to an embodiment of the invention.

FIG. 1 is a block diagram illustrating a configuration of an eyeglass lens manufacturing system 1 for realizing a manufacturing method for an eyeglass lens according to an embodiment. As shown in FIG. 1, the eyeglass lens manufacturing system 1 includes an eyeglass store 10 which orders eyeglass lenses in accordance with prescriptions for a customer (wearer), and an eyeglass lens factory 20 which receives an order from the eyeglass store 10 and manufactures eyeglass lenses. The order to the eyeglass lens factory 20 is made though data communication, such as a network (the Internet) or facsimile. The orderer may include an ophthalmologist and a consumer.

(Eyeglass Store)

A store computer 100 is installed in the eyeglass store 10. The store computer 100 is, for example, a PC (Personal Computer), and software for making an order for eyeglass lenses to the eyeglass lens factory 20 is installed in the store computer 100. To the store computer 100, lens data and frame data are inputted through user operation by an eyeglass store staff using a keyboard or a mouse. The lens data includes, for example, prescriptions (e.g., a base curve, a spherical power, a cylindrical power, an astigmatic axis, a prismatic power, a prism base setting, an addition, a distance PD (Pupillary Distance) and a near PD), wearing conditions for an eyeglass lens (a vertex distance, a forward-tilting angle, a frame tilt angle), types of eyeglass lenses (a single-vision spherical surface, a single-vision aspherical surface, multifocal (bifocal, progressive power), coating (dyeing processing, hard coating, anti-reflection coating, ultraviolet cutting)) and layout data according to user request. The frame data includes shape data of a frame selected by a customer. The frame data is managed, for example, by a barcode tag, and can be obtained by reading the barcode tag adhered to a frame with a barcode reader. The store computer 1 transmits the ordering data (the lens data and the frame data) to the eyeglass lens factory 20, for example, through the Internet.

(Eyeglass Lens Factory 20)

In the eyeglass lens factory 20, a LAN (Local Area Network) in which a host computer 200 servers as a central device is installed, and a number of terminal devices, such as, an eyeglass lens design computer 202 and an eyeglass lens processing computer 204, are connected to the LAN. Each of the eyeglass lens design computer 202 and the eyeglass lens processing computer 204 is a PC (Personal Computer), and a program for eyeglass lens design and a program for eyeglass lens processing are respectively installed on the eyeglass lens deign computer 202 and the eyeglass lens processing computer 204. To the host computer 200, the ordering data which has been issued from the store computer 100 is inputted through the Internet. The host computer 200 transmits the inputted ordering data to the eyeglass lens design computer 202.

After receiving the ordering data, design and processing for both of inner and outer surfaces are executed for an unprocessed block piece in the eyeglass lens factory 20 so that prescriptions for an wearer can be met. In the eyeglass lens factory 20, for enhancing productivity, the whole power range is divided into a plurality of groups, and a semi-finished blank having an outer (convex) curve shape (a spherical surface or an aspherical surface) and a lens diameter according to each group may be prepared in advance for ordering of eyeglass lenses. In such a case, in the eyeglass lens factory 20, an eyeglass lens meeting prescriptions of an wearer can be manufactured only by performing inner surface (concave surface) processing (and edge processing).

In the lens design computer 202, a program for designing an eyeglass lens according to an order has been installed, and lens design data is created based on the ordering data (lens data), and edge processing data is created based on the ordering data (frame data). The design of an eyeglass lens by the eyeglass lens design computer 202 is explained in detail later. The eyeglass lens design computer 202 transfers the created lens design data and the edge processing data to the eyeglass lens processing computer 204.

An operator places a block piece on a processing machine 206, such as a curve generator, and inputs a command for starting the processing to the eyeglass lens processing computer 204. The eyeglass lens processing computer 204 reads the lens design data and the edge processing data transferred from the eyeglass lens design computer 202, and drives and controls the processing machine 206. The processing machine 206 grinds and polishes the inner and outer surfaces of the block pieces in accordance with the lend design data, and creates an inner surface shape and an outer surface shape of the eyeglass lens. Furthermore, the processing machine 206 processes the outer circumferential surface of the uncut lens for which the inner surface shape and the outer surface shape have been made, so as to achieve a peripheral shape corresponding to the edge shape.

The eyeglass lens after the lens shape processing is subjected to various types of coatings, such as dyeing processing, hard coat processing, antireflection coating and ultraviolet cutting. As a result, finished eyeglass lenses are delivered to the eyeglass store 10.

(Specific Design Method for Eyeglass Lenses by the Eyeglass Lens Design Computer 202)

Figure 2:
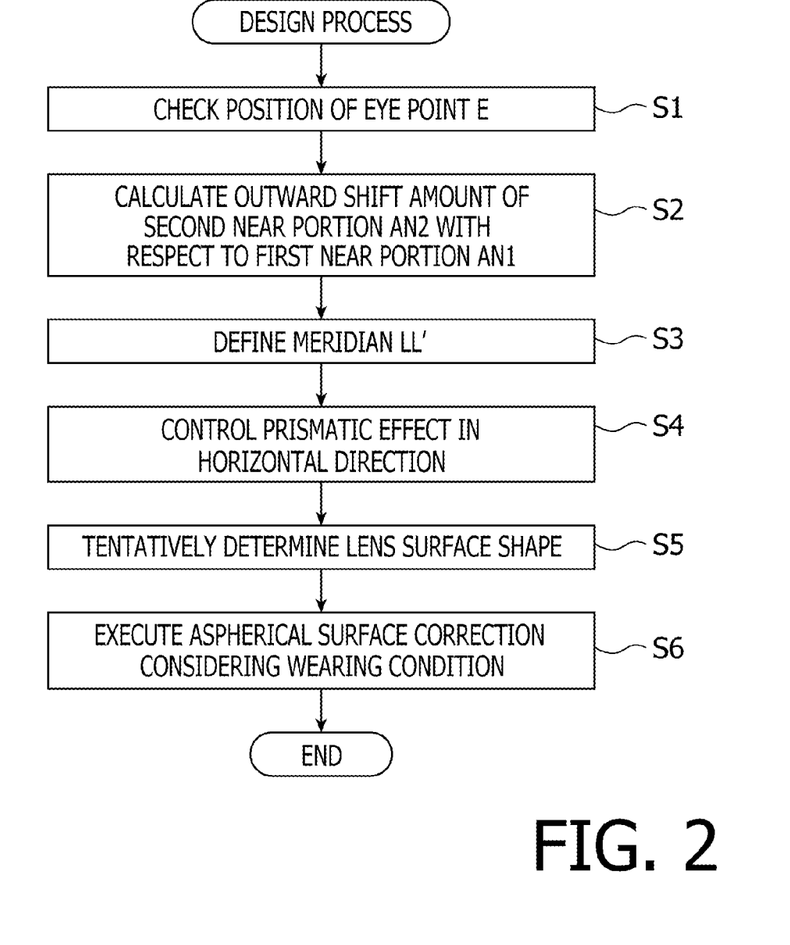
FIG. 2 is a flowchart illustrating a design process for an eyeglass lens by a eyeglass lens design computer according to the embodiment of the invention.

FIG. 2 is a flowchart illustrating a design process for an eyeglass lens by the eyeglass lens design computer 202. In FIG. 2 and the following explanation, a processing step is abbreviated as "S" for convenience of explanation. In the following, a design example is explained, supposing a near-near progressive power lens of a one-side aspherical surface type having a progressive power component on one of an inner surface and an outer surface, a double-sided progressive type in which a progressive power component is distributed to both of an outer surface and an inner surface, or a double-sided combination type in which a progressive power component in the vertical direction is distributed to an outer surface and a progressive power component in the horizontal direction is distributed to an inner surface. However, it should be understood that the present invention can be applied to various types of progressive power lenses, such as an intermediate-near progressive power lens or a distance-near progressive power lens of a one-side asphecrical surface type or a double-sided aspherical surface type.

Figure 3A:
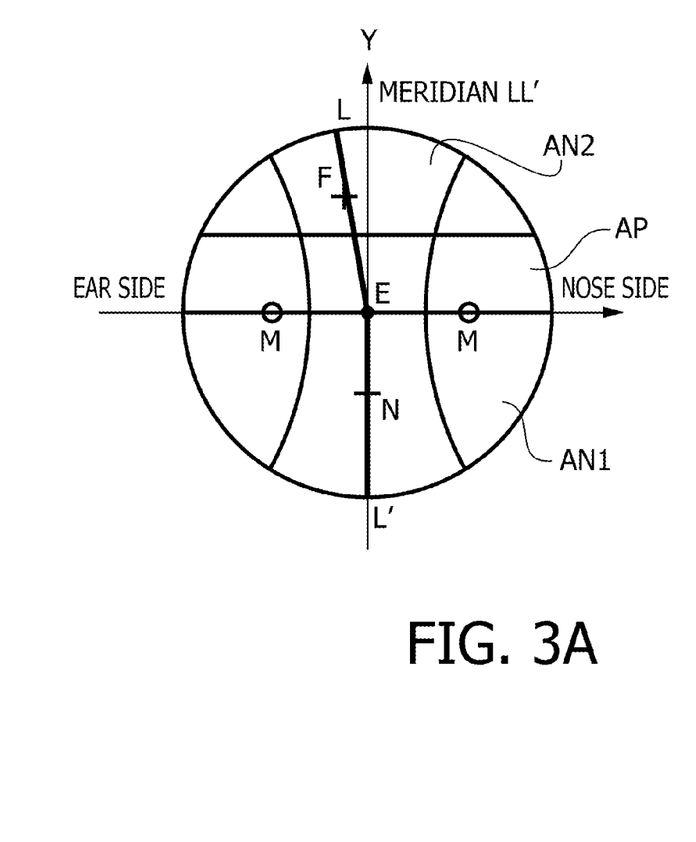
FIG. 3A illustrates a layout model of a near-near progressive power lens designed and manufactured according to the embodiment.
Figure 3B:
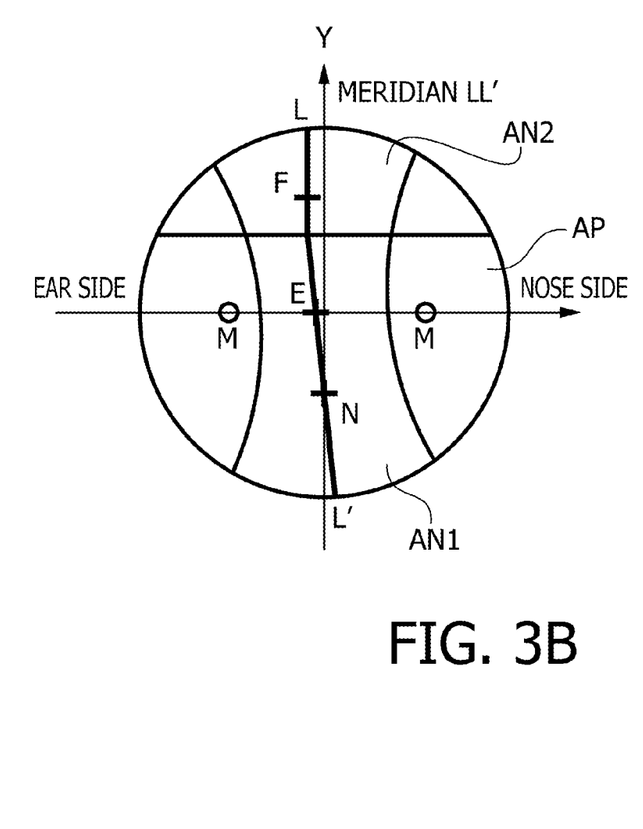
FIG. 3B illustrates a layout model of a near-near progressive power lens designed by a conventional design method.

FIG. 3A illustrates a layout model of a near-near progressive power lens designed and manufactured according to the embodiment. FIG. 3B illustrates a layout model of a near-near progressive power lens designed by a conventional design method. As shown in FIGS. 3A and 3B, the near-near progressive power lens has a first near portion AN1, a second near portion AN2 having a power lower than that of the first near portion AN1, and an intermediate power portion AP where power continuously decreases from the first near portion AN1 to the second near portion AN2. That is, the near-near progressive power lens is designed to be adapted for a distance ranging from the forefront to a depth of a desk, such as computer work and desk work. In the conventional design shown in FIG. 3B, a meridian LL' extends in the vertical direction in the second near portion AN2, and is shifted inward in the intermediate power portion AP and the first near portion AN1 in accordance with the convergence of eyes.

In a general design, the focal length f1 corresponding to the first near portion AN1 is larger than or equal to 0.4 m, and the focal length f2 corresponding to the second near portion AN2 is larger than the focal length f1 and smaller than or equal to 1.5 m. However, these values of the focal lengths f1 and f2 are examples, and a progressive power lens covering a relatively near distance range including a position close at hand is included in the near-near progressive power lens. The focal length f1 corresponds to the dioptric power (near dioptric power) at a near reference point N, and the focal length f2 corresponds to the dioprtic power (distance dioprtic power) at a distance reference point F. Positions of the near reference point N and the distance reference point F are identified in accordance with hidden marks directly marked on a lens surface based on the ordering data (layout data). An eye point E being a wearing reference is also identified based on a pair of hidden marks. In this embodiment, the eye point E coincides with the middle point of a line connecting the pair of hidden marks. The first near portion AN1 is located on the lower side of the eye point E, and the intermediate portion AP and the second near portion AN2 are located on the upper side of the eye point E.

S1 of FIG. 2 (Position Setting for Eye Point E)

The eyeglass lens design computer 202 sets the position of the eye point E (a pair of hidden marks M) based on the ordering data (layout data).

S2 of FIG. 2 (Calculation of Outward Shift Amount of Second Near Portion AN2 With Respect to First Near Portion AN1)

The eyeglass lens design computer 202 calculates an outward shift amount (a shift amount toward an ear in a lens wearing state) of the second near portion AN2 with respect to the first near portion AN1 based on a predetermined parameter in the ordering data received from the store computer 100 via the host computer 200. The parameter used to calculate the outward shift amount includes a near dioptric power and a distance dioptric power as well as a wearing condition, such as BC (base curve), PD (papillary distance), a vertex distance, a forward-tilting angle and a frame tilt angle.

S3 of FIG. 2 (Definition of Meridian)

The eyeglass lens design computer 202 defines the meridian LL' based on the eye point E and the outward shift amount calculated in S2 of FIG. 2. As shown in FIG. 3A, the meridian LL' is arranged in the vertical direction with reference to the first near portion AN1, and is extended to the second near portion AN2 while being inclined toward the ear side, considering divergence of eyes. Specifically, the meridian LL' is elongated downward in the vertical direction from the eye point E in the first near portion, and is elongated, from the eye point E, in the intermediate power portion AP and the second near portion AN2 in this order while being inclined toward the ear side in accordance with the outward shift amount calculated in S2 of FIG. 2. The near reference point N and the distance reference point F are arranged on the meridian LL'.

The eyeglass lens design computer 202 sets power distribution on the meridian LL' based on a predetermined parameter of the ordering data. The parameter used to set the power distribution on the meridian LL' includes a near dioptric power, a distance dioptric power, an addition, and the length of a progressive power zone of the intermediate power portion AP.

S4 of FIG. 2 (Control for Prismatic Effect in Horizontal Direction)

The eyeglass lens design computer 202 defines a plurality of cross sectional curves extending in the horizontal direction from the meridian LL', and sets the power distribution along each cross sectional curve in accordance with the dioptric power distribution of each of the first near portion AN1, the second near portion AN2 and the intermediate power portion AP. It should be noted that, if the power distribution is simply set without considering the difference between the dioptric power distributions of the power portions, a problem arises that the distortion becomes larger in the left and right direction. For this reason, the power distribution is set so that the prism effect is suppressed (controlled) at positions departing by a predetermined distance in the left and right direction from the meridian LL' in a state of not considering the inward shift and the outward shift (a part of a meridian shape in FIGS. 3A and 3B extending in parallel with Y-axis). Therefore, in compensation for control of the prismatic effect, the astigmatism becomes larger as the above described position becomes closer to the meridian LL'. For example, since, in the second near portion AN2, the meridian LL' is situated on the ear side with respect to a line on the Y-axis, the distance between the above described position and the meridian LL' is smaller on the ear side and is larger on the nose side. Therefore, in the second near portion AN2, the astigmatism becomes larger in the lateral area on the ear side and becomes smaller in the lateral area on the nose side.

S5 of FIG. 2 (Tentative Determination of Lens Surface Shape)

The eyeglass lens design computer 202 connects smoothly the power distributions on the meridian LL' and on the cross sectional curves extending in the horizontal direction by using, for example, Spline interpolation, and converts the connected power distributions into a curvature distribution with a known conversion expression, so as to tentatively determine the geometrical shape of the lens surface.

S6 of FIG. 2 (Correction for Aspherical Surface Considering Wearing Condition)

The eyeglass lens design computer 202 calculates the aspherical surface correction amount corresponding to the wearing condition (a vertex distance, a forward-tilting angle, a frame tilt angle) and adds the calculated aspherical surface correction amount to the lens surface shape tentatively determined in S5 of FIG. 2. As a result, the lens surface shape is determined, and the shape design for the near-near progressive power lens is completed.

The determined shape data (lens design data) for the near-near progressive power lens is transferred to the eyeglass lens processing computer 204. The eyeglass lens processing computer 204 drives and controls the processing machine 206 in accordance with the lens design data as described above, and processes a block piece to make a near-near progressive power lens. In the processing, marking of hidden marks is also performed.

(Comparison)

Figure 4A:
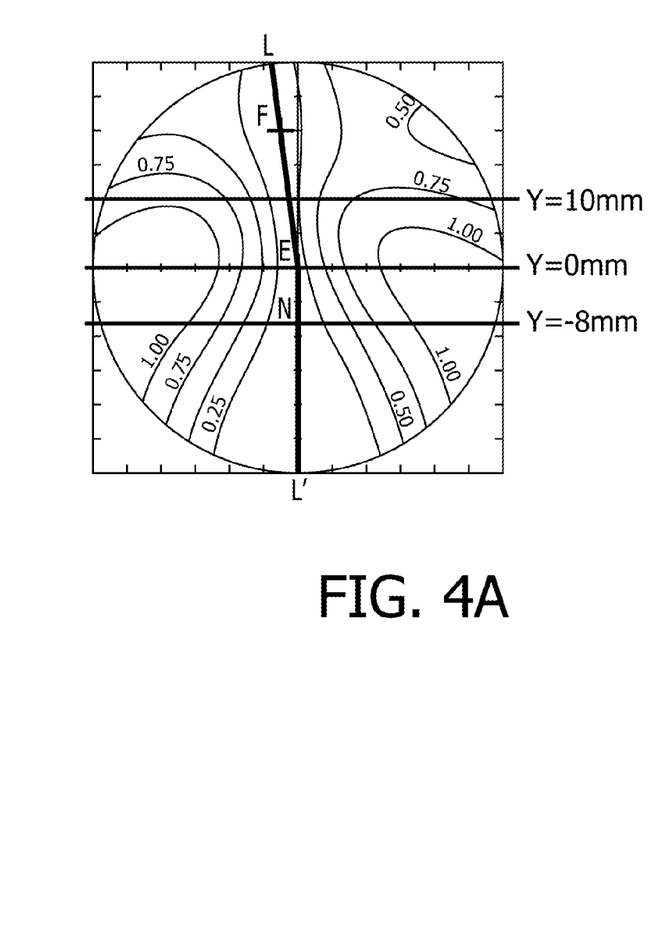
FIG. 4A illustrates the astigmatism distribution of the near-near progressive power lens according to the embodiment.
Figure 4B:
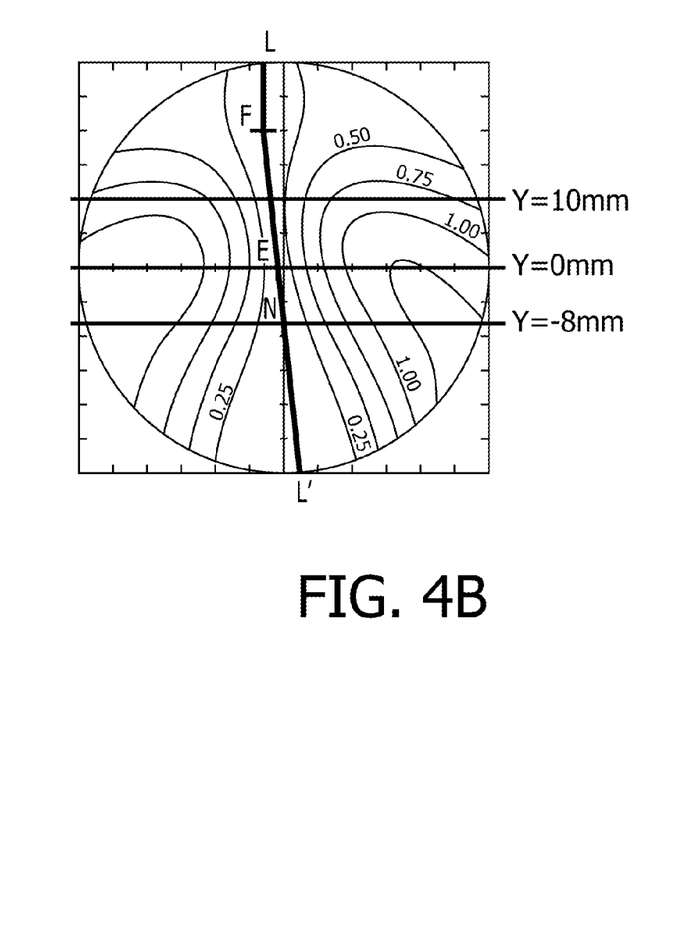
FIG. 4B illustrates the astigmatism distribution of the near-near progressive power lens designed by the conventional design method.

Hereafter, comparison between a near-near progressive power lens designed through the flowchart shown in FIG. 2 (hereafter, referred to as "present design") and a near-near progressive power lens design by a conventional design method is made. FIG. 4A illustrates the astigmatism distribution of the near-near progressive power lens according to the present design, and FIG. 4B illustrates the astigmatism distribution of the near-near progressive power lens designed by the conventional design method. FIG. 4A corresponds to the layout model shown in FIG. 3A, and FIG. 4B corresponds to the layout model shown in FIG. 3B.

Figure 5:
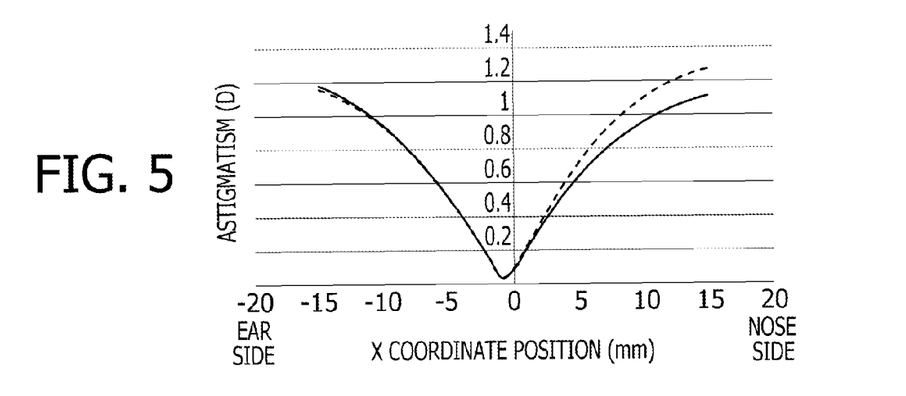
FIG. 5 shows an astigmatism distribution on a line of Y=0 mm in FIGS. 4A and 4B.
Figure 6:
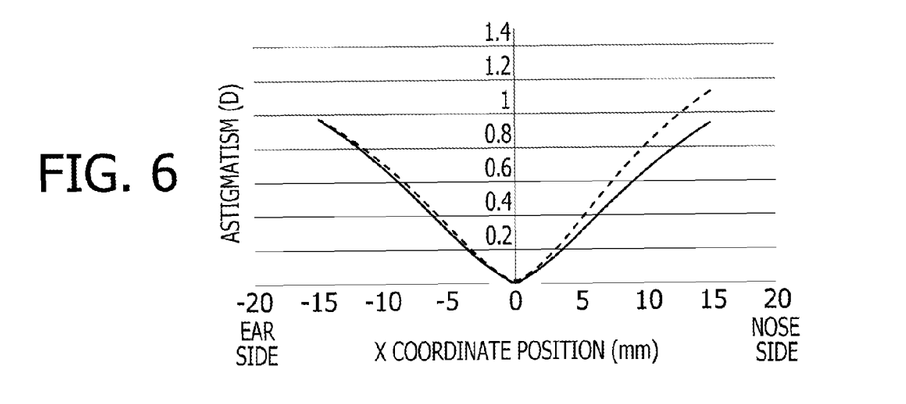
FIG. 6 shows an astigmatism distribution on a line of Y=−8 mm in FIGS. 4A and 4B.
Figure 7:
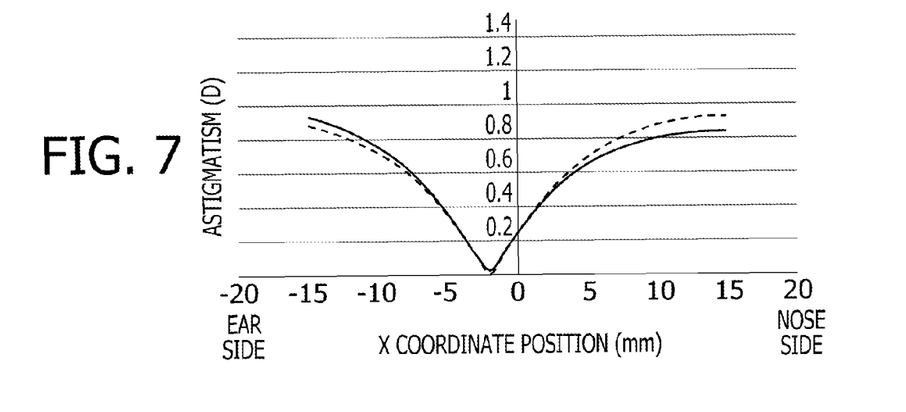
FIG. 7 shows an astigmatism distribution on a line of Y=10 mm in FIGS. 4A and 4B.

FIG. 5 shows an astigmatism distribution on the line of Y=0 mm in FIGS. 4A and 4B, FIG. 6 shows an astigmatism distribution on the line of Y=−8 mm in FIGS. 4A and 4B, and FIG. 7 shows an astigmatism distribution on the line of Y=10 mm in FIGS. 4A and 4B. In each of FIGS. 5 to 7, the vertical axis represents the astigmatism (unit: D), and the horizontal axis represents X coordinate (unit: mm) on the lens surface (the convex surface being the outer surface). The plus sign on the X coordinate represents the nose side with respect to the Y axis, and the minus sign on the X coordinate represents the ear side with respect to the Y axis. In each of FIG. 5 to 7, a solid line represents the near-near progressive power lens according to the present design, and a dashed line represents the near-near progressive power lens according to the conventional design.

The following Tables 1 to 3 respectively show values of the astigmatisms at X coordinates (X=−15 mm, −10 mm, −5 mm, 0 mm, 5 mm, 10 mm, 15 mm) on the lines of Y=0 mm, −8 mm, 10 mm shown in FIGS. 4A and 4B. In each of Tables 1 to 3, "difference" means the difference between the astigmatism caused in the present design and the astigmatism caused in the conventional design at each X coordinate. The line of Y=0 mm is a line passing through the eye point E, the line of Y=−8 mm is a line passing through the near reference point N, and the line of Y=10 mm is a line passing through a point in the intermediate power portion.

TABLE 1

|  | X = -15 | X = -10 | X = -5 | X = 0 | X = 5 | X = 10 | X = 15 |
|---|---|---|---|---|---|---|---|
| CONVENTIONAL DESIGN | 1.16 | 0.93 | 0.51 | 0.10 | 0.72 | 1.10 | 1.27 |
| PRESENT DESIGN | 1.18 | 0.94 | 0.51 | 0.09 | 0.64 | 0.96 | 1.11 |
| DIFFERENCE | -0.02 | -0.01 | 0.00 | 0.01 | 0.08 | 0.14 | 0.16 |

TABLE 2

|  | X = -15 | X = -10 | X = -5 | X = 0 | X = 5 | X = 10 | X = 15 |
|---|---|---|---|---|---|---|---|
| CONVENTIONAL DESIGN | 0.98 | 0.71 | 0.33 | 0.02 | 0.37 | 0.81 | 1.13 |
| PRESENT DESIGN | 0.97 | 0.68 | 0.30 | 0.01 | 0.30 | 0.66 | 0.94 |
| DIFFERENCE | 0.00 | 0.03 | 0.03 | 0.01 | 0.07 | 0.15 | 0.18 |

TABLE 3

|  | X = -15 | X = -10 | X = -5 | X = 0 | X = 5 | X = 10 | X = 15 |
|---|---|---|---|---|---|---|---|
| CONVENTIONAL DESIGN | 0.88 | 0.72 | 0.35 | 0.25 | 0.69 | 0.88 | 0.93 |
| PRESENT DESIGN | 0.93 | 0.75 | 0.35 | 0.25 | 0.65 | 0.80 | 0.84 |
| DIFFERENCE | -0.05 | -0.04 | -0.01 | 0.00 | 0.04 | 0.08 | 0.09 |

As shown in FIG. 4B, in the conventional design, the astigmatism distribution of the first near portion AN1 is asymmetric in the left and right direction with respect to the meridian LL' shifted inward to the nose side. Specifically, in the first near portion AN1, the astigmatism occurs largely in the lateral area on the nose side because the meridian LL' is shifted inward to the noise side (see a dashed line in each of FIGS. 5 and 6, and Tables 1 and 2). From a comparison between FIGS. 4A and 4B, it is understood that the lateral area on the ear side is shifted toward the nose side, and the near visual field is narrowed on the ear side. As described above, since the astigmatism concentrates on the nose side having high use frequently on the near-near progressive power lens and the near visual field is narrow, a wearer is easy to perceive a large level of distortion and shaking of an image.

On the other hand, according to the present design, as shown in FIG. 4A, the astigmatism distribution of the first near portion AN1 is substantially symmetrical in the left and right direction with respect to the meridian LL'. Therefore, the astigmatism does not occur intensively on the nose side or the ear side, and occurs substantially symmetrically in the left and right direction with respect to the meridian LU (see a solid line in FIG. 6 and Table 2). Furthermore, as can be seen from the comparison between FIGS. 4A and 4B, both of fields on the ear side and the nose side can be properly secured. Therefore, a wearer hard to perceive a large level of distortion and shaking of an image in the case where the wearer moves the visual line toward the nose side for near vision as well as in the case where the wearer moves the visual line toward the ear side. Furthermore, the astigmatism in the second near portion AN2 is asymmetric in the left and right direction with respect to the meridian LU shifted outward to the ear side in accordance with divergence of eyes. Specifically, in the second near portion AN2, the astigmatism occurs largely in the lateral area on the ear side due to the outward shift of the meridian LL' to the ear side. However, regarding the near-near progressive power lens, the use frequency of the lateral area on the ear side is low, and therefore there is no problem. As described above, by employing the present design, it is becomes possible to provide a near-near progressive power lens in which concentration of the aberration on the nose side can be avoided and the near visual field can be properly secured while considering divergence of eyes of a wearer.

The foregoing is the embodiment of the invention. Embodiments according to the invention are not limited to the above described examples, and various types of variations can be made within the scope of the technical concept of the invention. For example, examples and variations described herein by way of illustration or modifications thereof may be combined in an appropriate manner.

What is claimed is:

1. An eyeglass lens, comprising:
    a hidden mark defining a predetermined reference point on the eyeglass lens; and
    a plurality of refractive portions arranged along a meridian extending substantially in a vertical direction on the eyeglass lens via the predetermined reference point defined by the hidden mark,
    the plurality of refractive portions comprising:
        a first refractive portion which is located on a lower side of the predetermined reference point and has a first refractive power;
        a second refractive portion which is located on an upper side of the predetermined reference point and has a second refractive power smaller than the first refractive power; and
        an intermediate refractive portion in which refractive power continuously decreases from the first refractive portion to the second refractive portion,
    wherein:
        an aberration distribution in the first refractive portion is substantially symmetrical in a left and right direction with respect to the meridian extending in the vertical direction in the first refractive portion; and an aberration distribution in the second refractive portion is asymmetrical in the left and right direction with respect to the meridian shifted to an ear side in the second refractive portion in a wearing state.

2. The eyeglass lens according to claim 1, wherein the meridian extends in the vertical direction from a lower edge of the eyeglass lens to the predetermined reference point, and is shifted outward to the ear side in accordance with divergence of eyes from the predetermined reference point to an upper edge of the eyeglass lens.

3. The eyeglass lens according to claim 2, wherein:
the meridian extends in the vertical direction at least in the first refractive portion, and then extends to be inclined to the ear side along divergence of eyes in the intermediate refractive portion and the second refractive portion; and
an aberration distribution in the intermediate refractive portion and the second refractive portion is asymmetrical in the left and right direction with respect to the meridian inclined to the ear side in the intermediate refractive portion and the second refractive portion.

4. The eyeglass lens according to claim 1, wherein when a focal length corresponding to the first refractive power is defined as a first focal length and a focal length corresponding to the second refractive power is defined as a second focal length, the first focal length is longer than or equal to 0.4 m and is shorter than the second focal length, and the second focal length is longer than the first focal length and is shorter than or equal to 1.5 m.

5. A method for designing an eyeglass lens for a patient based on prescription information, said lens including a plurality of refractive portions arranged along a meridian extending substantially in a vertical direction on the eyeglass lens, the plurality of refractive portions including a first refractive portion having a first refractive power, a second refractive portion having a second refractive power smaller than the first refractive power and an intermediate refractive portion in which refractive power continuously decreases from the first refractive portion to the second refractive portion,
the method comprising performing each step below on a design computer to create a design for said lens:
an outward shift amount calculation step of calculating an outward shift amount of the second refractive portion toward an ear side with respect to the first refractive portion in a wearing state, based on said prescription information;
an meridian setting step of letting the meridian extend in a vertical direction at least in the first refractive portion and shifting outward the meridian extended in the vertical direction to the ear side at least in the second refractive portion in accordance with the outward shift amount;
a first aberration setting step of setting an aberration distribution in the first refractive portion to be substantially symmetrical in a left and right direction with respect to the meridian extending in the vertical direction; and
a second aberration setting step of setting an aberration distribution in the second refractive portion to be asymmetrical in the left and right direction with respect to the meridian shifted outward to the ear side.

6. The method for designing an eyeglass lens according to claim 5,
further comprising a mark setting step of setting a hidden mark for defining a predetermined reference point on the eyeglass lens,
wherein:
the first refractive portion is located on a lower side of the predetermined reference point defined by the hidden mark;
the second refractive portion is located on an upper side of the predetermined reference point; and
in the meridian setting step, the meridian extends in the vertical direction from a lower edge of the eyeglass lens to the predetermined reference point, and is shifted outward to the ear side in accordance with the outward shift amount from the predetermined reference point to an upper edge of the eyeglass lens.

7. The method for designing an eyeglass lens according to claim 6,
wherein:
the meridian extends in the vertical direction at least in the first refractive portion, and then extends to be inclined to the ear side in accordance with the outward shift amount in the intermediate refractive portion and the second refractive portion; and
an aberration distribution in the intermediate refractive portion and the second refractive portion is asymmetrical in the left and right direction with respect to the meridian inclined to the ear side in the intermediate refractive portion and the second refractive portion.

8. The method for designing an eyeglass lens according to claim 5,
wherein when a focal length corresponding to the first refractive power is defined as a first focal length and a focal length corresponding to the second refractive power is defined as a second focal length, the first focal length is longer than or equal to 0.4 m and is shorter than the second focal length, and the second focal length is longer than the first focal length and is shorter than or equal to 1.5 m.

9. A manufacturing method for an eyeglass lens, comprising:
an eyeglass lens manufacturing step of manufacturing an eyeglass lens designed using a design method for an eyeglass lens according to claim 5.

10. A design system for an eyeglass lens including a plurality of refractive portions arranged along a meridian extending substantially in a vertical direction, the plurality of refractive portions including a first refractive portion having a first refractive power, a second refractive portion having a second refractive power smaller than the first refractive power and an intermediate refractive portion in which refractive power continuously decreases from the first refractive portion to the second refractive portion,
the design system comprising:
an ordering side terminal device that transmits prescription information as ordering data; and
a design side terminal device that receives the ordering data and designs the eyeglass lens adapted to the prescription information,
wherein the design side terminal device comprises:
an outward shift amount calculation unit that calculates an outward shift amount of the second refractive portion toward an ear side with respect to the first refractive portion in a wearing state, based on the prescription information;
an meridian setting unit that lets the meridian extend in a vertical direction at least in the first refractive portion and shift outward the meridian extended in the vertical direction to the ear side at least in the second refractive portion based on the outward shift amount;

a first aberration setting unit that sets an aberration distribution in the first refractive portion to be substantially symmetrical in a left and right direction with respect to the meridian extending in the vertical direction; and
a second aberration setting unit that sets an aberration distribution in the second refractive portion to be asymmetrical in the left and right direction with respect to the meridian shifted outward to the ear side.

\* \* \* \* \*